(12) United States Patent
Ding

(10) Patent No.: US 8,161,420 B2
(45) Date of Patent: Apr. 17, 2012

(54) SYSTEM AND METHOD FOR SECURITY MANAGEMENT OF HOME NETWORK

(75) Inventor: Zhiming Ding, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 738 days.

(21) Appl. No.: 12/259,653

(22) Filed: Oct. 28, 2008

(65) Prior Publication Data

US 2009/0083846 A1    Mar. 26, 2009

Related U.S. Application Data

(63) Continuation of application No. PCT/CN2007/001329, filed on Apr. 23, 2007.

(30) Foreign Application Priority Data

Apr. 28, 2006  (CN) .......................... 2006 1 0060542

(51) Int. Cl.
*H04L 29/06* (2006.01)
(52) U.S. Cl. ................ 716/12; 726/11; 726/13; 726/14; 726/15; 726/16; 713/168; 713/169; 713/170; 713/171; 713/172
(58) Field of Classification Search ............. 726/12
See application file for complete search history.

(56) References Cited

U.S. PATENT DOCUMENTS

| | | |
|---|---|---|
| 2005/0086514 A1 | 4/2005 | Han et al. |
| 2005/0210532 A1* | 9/2005 | Winick ............. 726/22 |

FOREIGN PATENT DOCUMENTS

| | | |
|---|---|---|
| CN | 1481120 | 3/2004 |
| CN | 1561136 | 1/2005 |
| CN | 1747427 | 3/2006 |
| CN | 1750461 | 3/2006 |
| CN | 1863195 | 11/2006 |
| CN | 101064628 B | 2/2011 |
| EP | 1 372 301 | 12/2003 |
| EP | 1 416 684 | 5/2004 |

(Continued)

OTHER PUBLICATIONS

English translation of the PCT Written Opinion of the International Searching Authority for Application No. PCT/CN2007/001329 mailed Aug. 2, 2007, 5 pgs.

(Continued)

*Primary Examiner* — Longbit Chai
(74) *Attorney, Agent, or Firm* — Finnegan, Henderson, Farabow, Garrett & Dunner LLP

(57) ABSTRACT

A security management system of a home network is provided. The home network includes a home gateway and one or more user devices connected to the home gateway. The security management system further includes a security management server adapted to provide a security management service for the home network. Within the home network, a security management module is disposed to provide a security service for the user devices within the home network. The user devices and a device where the security management module locates have unique device identifications, and the home network has a unique network identification. By the home gateway, the security management server communicates with the security management module. With the network identification and the device identification, the security management server and the security management module achieve a security management for the home network through a registration of the home network and a registration of the user device. A security management method of home network devices is also provided.

20 Claims, 10 Drawing Sheets

FOREIGN PATENT DOCUMENTS

| | | | |
|---|---|---|---|
| JP | EP 1372301 A1 | * | 12/2003 |
| KR | 20050030706 A | | 3/2005 |
| KR | 1020050030706 A | | 3/2005 |
| WO | WO 2007/131415 | | 11/2007 |

OTHER PUBLICATIONS

European Patent Office Communication for Application No. 07720902.1 enclosing the European search report (under R. 61 or R. 63 EPC) or the supplementary European search report (Art. 153(7) EPC), dated Jan. 8, 2010, 3 pgs.

Ellison, Carl, "UPnP™ Security Ceremonies Design Document—for UPnP™ Device Architecture 1.0", Oct. 2, 2003, 2003 Contributing Members of the UPnP™ Forum, 18 pgs.

European Office Action in reference to Int'l Patent Application No. 07720902.1, dated Sep. 13, 2011 (6 pgs.).

* cited by examiner

SYSTEM AND METHOD FOR SECURITY MANAGEMENT OF HOME NETWORK

The present application is a continuation of International Patent Application Serial No. PCT/CN2007/001329, filed Apr. 23, 2007, which claims to the benefit of Chinese Patent Application Ser. No. 200610060542.3, entitled "SYSTEM AND METHOD FOR SECURITY MANAGEMENT OF HOME NETWORK DEVICES" and filed on Apr. 28, 2006, both of which is are hereby incorporated herein by reference in their entireties.

The application claims priority to Chinese Patent Application No. 200610060542.3, entitled "SYSTEM AND METHOD FOR SECURITY MANAGEMENT OF HOME NETWORK DEVICES" and filed on Apr. 28, 2006, which is incorporated herein by reference in its entirety.

BACKGROUND OF THE INVENTION

1. Field of the Invention

The present invention relates to security management technology of home network devices, and more particularly to a security management system and method of home network.

2. Description of the Related Art

At present, an ADSL modem that conventionally realizes only the access function is about to be replaced by a device named "home gateway (HGW)" with more comprehensive functions. As shown in FIG. 1, the HGW not only realizes the access and routing functions of the ADSL modem, but also integrates the LAN switching function, provides the firewall, NAT, QoS, time service, and the like, and even directly provides the VoIP service. Moreover, the HGW generally provides a wireless access function, so that a computer with a wireless network card can be connected with the HGW without any wire.

The UPnP technology forum is an organization researching the plug and play technology of home network devices and initiated by the Microsoft Corporation. The organization researches the Universal Plug and Play (UPnP) communication protocol with the aim of enabling any intelligent household appliance devices including household information devices to be used upon access to the network with this protocol as easily as the household appliances nowadays without requiring expertise of users. Such a network is called a UPnP network.

The UPnP protocol logically categorizes network entities into control points (CPs) and devices. The CPs discover and control the devices. The CP actively queries for existing devices on the network after the startup. The device realizes a specific application function. After the startup, the device declares its existence to the outside so as to be discovered by the CPs and publicizes events it may produce in the declaration. After discovering the device, the CP can subscribe an event of the device which interests the CP. The device sends this event to the CP subscribing this event after producing the event. The CP may control the event of the device correspondingly. The CP may control the device automatically or via a man-machine interface. It should be noted that the devices mentioned in UPnP are logical entities instead of physical devices. One physical device may consist of one or more UPnP devices, or further include one CP entity. One physical device may also consist of one CP only. In special cases, one physical device may include multiple CPs, for example, multiple pieces of software on the computer realizing functions of multiple CP entities.

The UPnP protocol also has a security mechanism, and thus a security console (SC) entity is added. The SC is not only a CP but also a device. As a CP, the SC can discover and control other devices/SCs. As a device, the SC can declare itself to other CPs/SCs and be controlled.

The UPnP security mechanism is adopted in consideration of the access to and control on security devices of the CP/SC. UPnP categorizes devices into security devices and non-security devices. The access to and control on the security device is limited and needs to be authorized by the security device. Moreover, when accessing a security device, the accessing device needs to be certified.

The UPnP device provides one or more services. The difference between the security device and the non-security device lies in that the security device has a special security service. Through the security service of the device, the SC can obtain the key, certificate, access control list, owner list, and other information for operating the device. The UPnP security device uses the owner list, the access control list, and the certificate as three elements to compose an access authority management security framework.

The device stores an owner list that records which CPs/SCs own this device. The CPs/SCs (i.e. owners) that own this device have 100% control right on this device. The first owner (necessarily the SC) of the device obtains the ownership of this device through the Simple Service Discovery Protocol (SSDP) in combination with a manual operation. Every security device has an initial key system. In order to realize the operation of first owning, the security device has a security ID and an initial password (it should be noted that the SC is also a security device) that both can be obtained directly from the machine body, display, or random card of the device. When the device has a null owner list and accesses the UPnP network, the SC can discover this device through the auto-discovery protocol, determine it to be a security device through the characteristic that it has a security service, read a security ID of the device, and then display it to the user. The user identifies the device through the security ID, selects the device, and then names the device. The named device is displayed with its name instead of the security ID (the name is stored on the SC). The user can continue to input the initial password of the device. After a confirmation, the SC sends its own security ID to the device. The device adds this SC into the owner list, and the SC owns this device. Thereafter, other SCs/CPs can own this device through the authorization operation on this SC.

The device also stores an access control list to partly authorize the CPs/SCs. The partly authorized CPs/SCs do not own this device and can only perform a limited access to this device. The user may edit the access control list on the SC owning this device. The statements that the device authorizes the CPs/SCs and that the owner SC of the device authorizes other CPs/SCs have the same meaning, because if an owner completely owns the device, the owner becomes a right proxy of the device.

Every CP/SC that can operate the security device holds a certificate indicating the legal authority of this device. This certificate is generated by the owner SC of the device.

The UPnP security mechanism also uses a signature and encryption manner to ensure the security of messages. The device has an initial public key that can be obtained directly by the SC. The security ID of the security device is in fact a visual hash value based on its public key with generally short bits, which is used for identification only and equivalent to the name. This security ID is obtained by both the SC and the device with exactly the same hash algorithm.

The UPnP security mechanism is equally applicable to a wired or wireless access and of course is proposed for the wireless access first. The wired access is physically restricted to the inside of the home that is considered secure. As shown in FIG. 2, in respect of the wireless access, an illegal CP/SC cannot operate the security device since it cannot be authorized by the security device, thereby ensuring the security. Similarly, this mechanism equally works on the wired access extended to outdoors.

As can be seen from the above description, the UPnP security mechanism has the following defects.

(1) The UPnP security mechanism needs the manual intervention. The owning and authorization processes described by the UPnP security mechanism are not simple, and the user is still required to possess certain expertise, for example, knowledge about the owner list, access control list, and the like.

(2) The UPnP security mechanism disenables unauthorized (physical) devices to access security devices protected by the authority, but can neither prevent illegal users from accessing those security devices nor prevent non-UPnP security devices from accessing the network and further accessing the Internet via the HGW, i.e., embezzling Internet access accounts. The latter situation easily occurs when the wireless access is used.

(3) Before transferring (for example, reselling) a UPnP device, the device must be recovered to its initial state, i.e., factory settings and unownedness artificially. In the case of a transfer before the recovery to the initial state (for example, a theft), the case of the account embezzlement easily occurs. For example, a VoIP user device generally associates a calling number with the device itself. After the device is transferred elsewhere, the original number can still be used to make an IP call.

SUMMARY OF THE INVENTION

In view of the above defects in the prior art, embodiments of the present invention are directed to solving the problem that an authorization access of a device needs to be realized by a manual operation of a user, and a user account and the device are easily embezzled in the existing mechanism.

An embodiment of the present invention provides a security management system of a home network. The home network includes a home gateway (HGW) and one or more user devices connected to the HGW.

The security management system further includes a security management server (SMS) adapted to provide a security management service for the home network.

A security management module (SMM), provided within the home network, is adapted to provide a security service for the user devices.

The user devices and a device where the SMM locates have unique device identifications (NTIDs). The home network has a unique network identification (NID). The SMS communicates with the SMM by the HGW. The SMS and the SMM achieve a security management for the home network through a registration of the home network and a registration of the user device by using the NID and the NTID.

An embodiment of the present invention provides a security management method of a home network. The method includes the following steps.

An SMS is disposed, and an SMM is disposed within the home network.

The SMS communicates with the SMM by an HGW within the home network. The SMS and the SMM achieve a security management for the home network through a registration of the home network and a registration of the user device by using an NID and an NTID.

With the above technical schemes, the embodiments of the present invention at least have the following beneficial effects.

(1) As long as the user pre-applies for a security service to the SMS for its device, the device can automatically realize a security service registration process similar to the user manual confirmation process in the UPnP security mechanism upon access to the network, and this pre-application process only requires the user to provide relevant information instead of understanding technical problems.

(2) The access security is stronger than that of the UPnP security mechanism. All accessed devices can verify the validity of accessing devices by registrations.

(3) Since the device is registered with the SMS, a device will be discovered by the SMS after being illegally transferred to another network. The problem that the user account and the device are easily embezzled can be solved owing to the disposed SMM.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE EMBODIMENTS

A security management mechanism of network devices is provided in the embodiments of the present invention by using a network identification (NID) concept in combination with unique network terminal identifications (NTIDs). The NID is a character string assigned automatically by a server in a public network, i.e. a wide area network (WAN), or designated by a user, and uniquely identifies a local area network (LAN). The NTID is an information string supported by all devices in a user's home network which has a unified format and can uniquely identify a device. The format of the NTID may be the "OUI-device serial number" format defined in the technical document TR069 of the DSL forum. Other forms of unique NTID information are also available, such as a device identification of a home gateway (HGW) or a device identification of a device which has a security management module (SMM), a WAN access account, an Internet domain name or a fixed IP address, a home phone number of the user.

Figure 1:
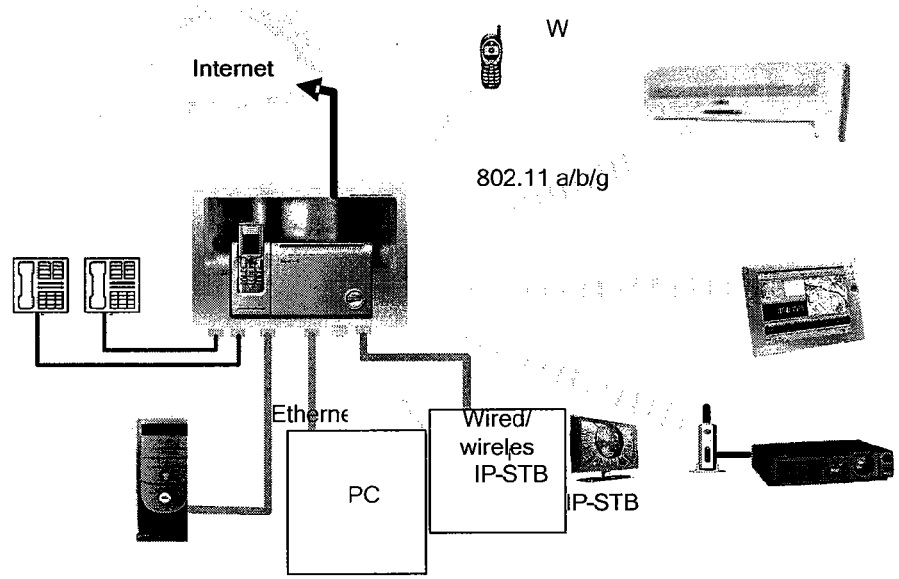
FIG. 1 is an example diagram illustrating a networking of a home network.
Figure 2:
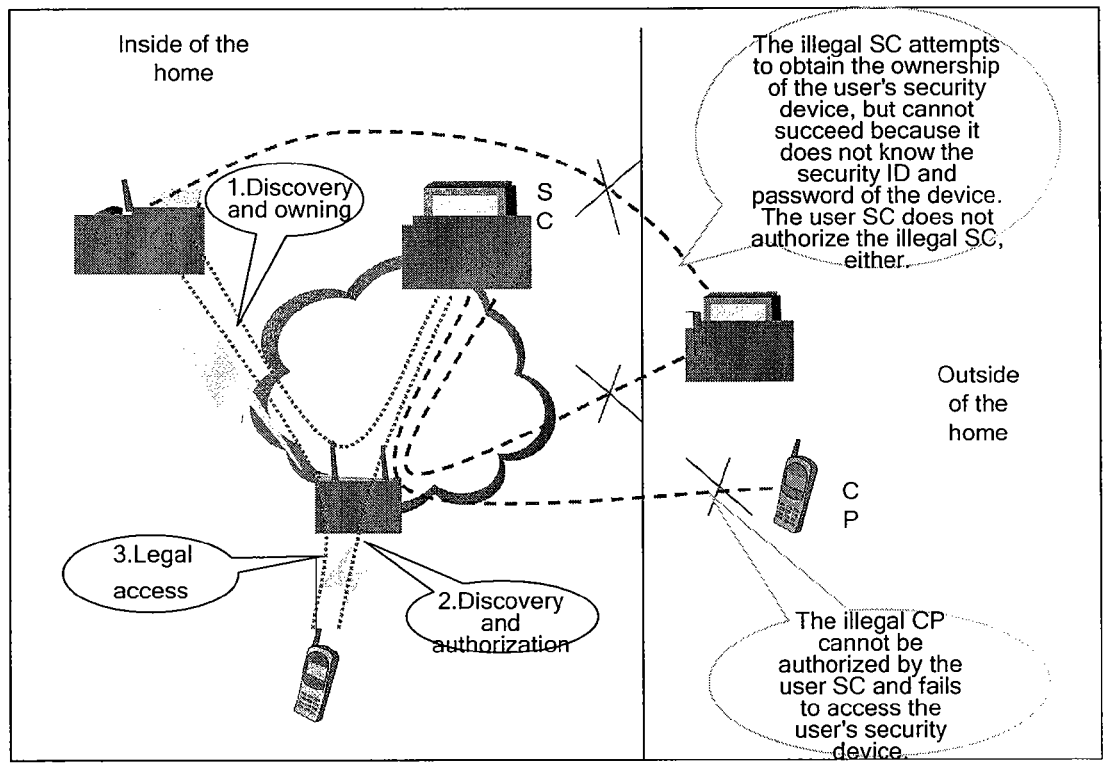
FIG. 2 is a schematic diagram of an existing mechanism.
Figure 3:
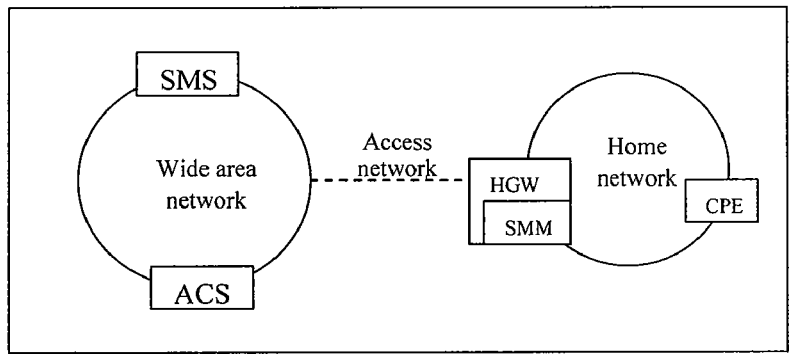
FIG. 3 is a structural diagram of a system embodiment of the present invention.

As shown in FIG. 3, the system in an embodiment of the present invention includes a security management server (SMS) on the public network, an SMM within the home network, all customer premises equipments (CPEs, i.e., user devices) in the home network, and an auto-configuration server (ACS) on the public network. In a broad sense, the CPE may include the SMM and the HGW. Functions of the functional entities in FIG. 3 will be introduced below respectively. The SMM may be an independent physical device or a functional module of other device, for example, a functional module of the HGW.

1. SMS

In one embodiment of the present invention, a security management server (SMS) is disposed on the WAN. A business entity owning and managing this server can be called a home network security service provider (SSP). The SMS provides service for a security management of the home network devices and has the following main functions.

1) The SMS accepts the user's application for a network security service.

1.1) When applying for the network security service, the user provides an NTID of the SMM device.

1.2) The SMS automatically generates a unique home network identification (NID) and password, or accepts an NID and password designated by the user, so as to ensure the uniqueness of the NID.

1.3) New records are generated in an NID list (NID-L). A structure of the NID-L is shown in Table 1.

TABLE 1

Format of NID-L

| NID | $PSW_{(NID)}$ | $NTID_{(SMM)}$ | $SKey_{(SMM)}$ | User name | User address | Other contact method | State | Remarks | Latest registration time |
|---|---|---|---|---|---|---|---|---|---|

NID: a unique network identification assigned automatically by the SMS or designated by the user.
$PSW_{(NID)}$: a corresponding password of the NID, generated automatically by the SMS or designated by the user.
$NTID_{(SMM)}$: a unique identification of the user's SMM (see later description) device provided by the user when applying for the network security service.
$SKEY_{(SMM)}$: an encryption public key of the SMM.
User name: the name of the user, to which identity card information may be added.
User address: user address information.
Other contact method: phone number or e-mail and the like for contacting the user in special cases.
State: values thereof are described as follows.
"1"-applied: the SMM of the user has not registered with the SMS; an initial value of a new record.
"2"-under application: the SMM of the user has registered with the SMS, not indicating whether the device is on line.
"3"-deregistered: the user has cancelled the network security service. Such record may be transferred to another list to be reserved for future reference.
Latest registration time: the latest time when the SMM registers the security service, which is recorded when the SMS accepts the registration.
Remarks: other useful information.

2) The SMS accepts the user's home network security service registration.

After the user applies for the network security service, the SMM in the user's network can register the network security service with the SMS to obtain its own NID. The processes will be described in the method of network security service registration.

3) The SMS accepts the user's pre-application for the security service for its CPE.

3.1) When pre-applying for the security service for its CPE, the user should provide the NID, $PSW_{(NID)}$, NTID of the CPE, and an initial password of the CPE (when the CPE is a security device).

3.2) The SMS generates new records in an NTID list (NTID-L). The format of the NTID-L is shown in Table 2.

TABLE 2

Format of NTID-L

| $NTID_{(CPE)}$ | NID | $PSW_{(CPE)}$ | State | Latest registration time |
|---|---|---|---|---|

$NTID_{(CPE)}$: the NTID of the CPE.
NID: the NID of the home network of the CPE.
$PSW_{(CPE)}$: the password of the CPE marked in a label, random card, specification, or other data of the CPE, which is null if the CPE is a non-security device.
State: values thereof are described as follows.
"1"-applied: the user has pre-applied the security service but has not registered it on line; an initial value of a new record;
"2"-under application: the user has registered the security service on line, not indicating whether the device is currently on line;
"3"-deregistered: the user has cancelled the security service of the device. Such record may be transferred to another list to be reserved for further reference.
Latest registration time: the latest time when the SMM registers the security service for the CPE, which is recorded when the SMS accepts the registration.

4) The SMS accepts the CPE's registration of the security service.

As long as the user has applied for the network security service, the NID is obtained. No matter the user has pre-applied for the security service for its CPE or not, the CPE security service registration can be accepted. The detailed processes for the CPE to register the security service will be described later.

5) The SMS generates records for all registration events of the SMM including the SMM's registration of the network security service and the registration of a device security service for the CPE, and stores the records.

2. SMM within the Home Network

An SMM exists within the user's home network, which may be a part of the HGW or an independent device. The SMM has the following main functions.

1) The SMM records and manages NTIDs of all CPEs in the home network and other auxiliary information. The SMM uses a CPE list (CPE-L) to manage the CPEs, as shown in Table 3.

TABLE 3

CPE-L used by SMM

| $NTID_{(CPE)}$ | IP address | State | Other information |
| --- | --- | --- | --- |

$NTID_{(CPE)}$: the NTID of the CPE.
IP address: IP address information when the CPE is on line, which is undefined if the CPE is off line.
State: indicating the state of the CPE and having the following possible values.
"0"-offline
"1"-online.

2) The SMM registers the security service with the SMS for the CPE in the home network. The registration processes will be described in the method of CPE security service registration.

3) When the SMM cannot be connected to the SMS, the SMM can provide the security service for the CPE in the network and caches CPE online records to a CPE-L-UR list (UR means unregistered with the SMS). The method for the SMM to provide the security service is described later. The CPE-L-UR may use the format in Table 4.

TABLE 4

Format of list of CPE online record uncertified by SMS (CPE-L-UR)

| $NTID_{(CPE)}$ | Online time | Password |
| --- | --- | --- |

$NTID_{(CPE)}$: the NTID of the CPE
Online time: the time when the CPE declares itself at a power-up, including year, month, date, hour, minute, and second.
Password: the password of the CPE (when the CPE is a security device), which is null if the CPE is a non-security device and may be null if the CPE is a registered security device. The password is useful only when the security device first enters the user network through the manual confirmation, and is adapted to report this information to the SMS. The information is then stored by the SMS.

4) When the SMM can be connected to the SMS, if a CPE online record unregistered with the SMS exists, the SMM sends it to the SMS for a hysteretic security verification.

5) The SMM provides a security certification service for the access to a device in the network.

6) The SMM stores access events to the device in the network.

3. CPE

In order to realize the security service described in the embodiments of the present invention, the CPE must have the following functions.

1) The CPE should be able to declare itself when accessing the network and include its own NTID in the declaration message, or feed the NTID back when the SMM queries for the NTID after receiving the declaration message. The declaration message may be a broadcast message or a message sent from point-to-point. In this way, the SMM in the network can obtain the NTID of the CPE when knowing that the CPE is on line, and register the security service with the SMS for the CPE. In one embodiment, the CPE carrying the NTID in the declaration message is taken as an example. The security device should further identify itself as a security device in the declaration, and the SMM will also include an identification indicating that the CPE is a security device in the registration message. The declaration message of the CPE is a broadcast message, so that the CPE needs not to know the address of the SMM from the beginning. The CPE is notified of the address information of the SMM by the SMM at every startup without storing the address information in a permanent storage.

2) When receiving an access to itself, the CPE may verify whether it is a legal device through the SMM. The detailed processes will be described in a method of security access control. When the CPE cannot obtain the address of the SMM, whether other device is allowed to access the CPE is determined by the CPE itself, which is not limited in the present invention.

3) The CPE can send an access event to itself to the SMM to be stored.

4. ACS

The auto-configuration server (ACS) is also a server at the WAN side adapted to realize an automatic configuration of the CPE. In one embodiment of the present invention, a configuration file sent from the ACS to the SSM is required to contain the address information of the SMS and a certificate. Therefore, the SSM obtains the address of the SMS and a key enabling a secret communication with the SMS when obtaining the automatic configuration.

Relevant processing methods in the embodiment of the present invention are described below one by one.

I. Method of Network Security Service Registration

1) At a startup, if the SMM does not know an address of the SMS, the SMM sends a request to the ACS to request a configuration of the ACS; if the SMM has known the address of the SMS, the flow proceeds to Step 3.

2) The ACS sends the address information of the SMS and a certificate to the SMM in a certain manner, for example, through a configuration file or by accessing a data node of the SMM.

3) After obtaining the address of the SMS, the SMM sends a network security service registration message including its own NTID, an NID, and an encryption public key to the SMS. When the SMM has not obtained the NID, the NID in the registration message is null. The communication between the SMS and the SMM needs to be secure. Therefore, the SMM needs to obtain a public key from the SMS, use the public key of the SMS to encrypt the information sent by itself, and include its own encryption public key in the registration message. Afterwards, the SMS can use the public key of the SMM for encrypting a message when sending the message to the SMM. The SMM should obtain the public key of the SMS before sending the registration message. The SMM may obtain the public key from the SMS directly or from a CA of the SMS, which is not defined in the present invention.

Figure 4:
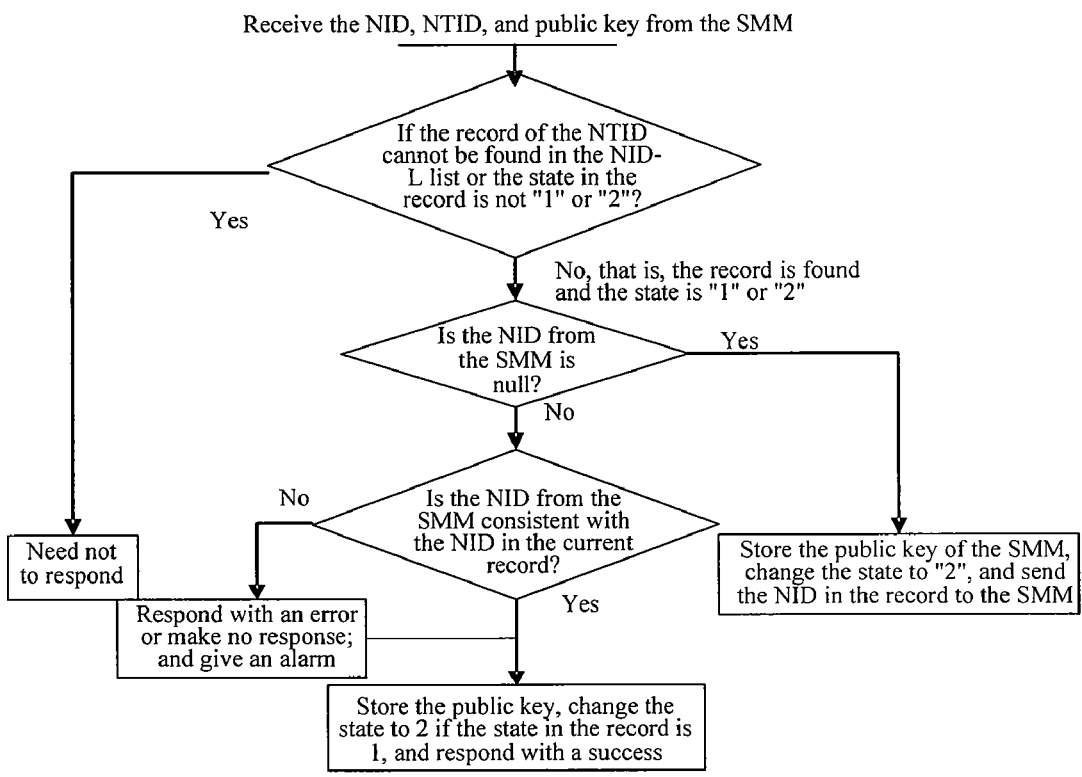
FIG. 4 is a flow chart illustrating a processing when a security management server (SMS) receives a network security service registration message of a security management module (SMM) in a method embodiment of the present invention.

(4) After receiving the network security service registration message, the SMS searches the NID-L list for the NTID of the SMM as shown in FIG. 4.

(4.1) If the SMS does not find the NTID or the SMS finds the NTID but the value of the application identification in the record is "3" (indicating that the NTID has been deleted), the SMS ignores it and needs not to send a response message.

4.2) If the SMS finds the NTID and the NID sent by the SMM is null (at this time, the application identification in the record should be "1"), the SMS stores the public key information of the SMM sent by the SMM, sets the application identification to "2", responds with a registration successful message, and the NID in the record is attached in the registration successful message. The response message is encrypted with the public key of the SMM (which is the same below and will not be repeated).

4.3) If the SMS finds the NTID but the NID sent by the SMM is not null and not consistent with the NID in the record, the SMS gives an alarm and responds with an error or does not respond (such case should not occur).

4.4) If the SMS finds the NTID and the NID sent by the SMM is not null and is consistent with the NID in the record (at this time, the application identification in the record should be "2"), the SMS responds with the registration successful message.

5) The SMM receives the response message of the SMS.

5.1) If the response message is registration successful, it indicates that the network security service is successfully registered. If the registration is the first registration of the SMM, the NID is extracted from the response message and stored.

5.2) If the response message is error information, it indicates that the network security service is unsuccessfully registered.

II. Method of CPE Security Service Registration

1) After accessing the network, the CPE, for example, declares its existence with a broadcast message and includes its own NTID in the declaration message. If the CPE is a security device with limited access thereto, an identification indicating that the CPE is a security device should be further included.

2) After receiving the declaration message of the CPE, the SMM sends to the SMS a CPE device security service registration message including an NID, an NTID of the CPE, and an identification indicating whether the CPE is a security device. The message is encrypted with a public key of the SMS (all the following interactive messages are encrypted and will not be repeated).

3) After sending the CPE registration message, the SMM searches the CPE-L for the NTID of the CPE.

3.1) If this CPE exists in the CPE-L, the SMM adds the CPE to the CPE-L-UR list (see Table 4) and informs the CPE of the address of the SMM.

3.2) If this CPE does not exist in the CPE-L, the SMM adds the CPE to the unconfirmed CPE list CPE-L-UC (UC means unconfirmed by the user), indicates whether the CPE is a security device or a non-security device, and then waits for a manual confirmation or a registration result of the SMS. The format of the CPE-L-UC is shown in Table 5.

TABLE 5

Format of unconfirmed CPE record list CPE-L-UC

| NTID$_{(CPE)}$ | Security mark |
| --- | --- |

NTID$_{(CPE)}$: the NTID of the CPE
Security mark: values thereof are described as follows:
0 - non-security device;
1 - security device.

4) The user confirms the security device manually.

4.1) The SMM displays the NTID or simple terminal identification (STID) of the CPE in the CPE-L-UC list to the user. The STID is the first 4 to 5 characters of digest information of the NTID obtained using a certain digest algorithm and encoded with the BASE64. The STID cannot uniquely identify a device, but is difficult to be repeated in one home, and is easy to be read due to shortness.

4.2) The user views the label, random card, specification, and other data of the CPE to obtain the NTID or STID of the device, views the display information on the SMM, selects the desired CPE, and confirms the CPE. For a security device, a password of the CPE must be input at the confirmation. The password similarly comes from the card, label, specification, and other data of the device. If the CPE is a non-security device, the flow proceeds to Step 4.6 after the confirmation.

4.3) If the CPE is a confirmation of the security device, the SMM encrypts the input password with a public key of the CPE and sends it to the CPE. The security CPE has an initial security certificate and its encryption public key can be directly read.

4.4) The CPE receives the password information from the SMM, verifies the correctness of the password information, and returns to the SMM a verification result that may be Pass or Fail.

4.5) The SMM receives the verification result of the CPE. If the verification is failed, the flow returns to 4.2; otherwise, the flow proceeds to 4.6.

4.6) The SMM adds relevant information of the CPE to the CPE-L-UR and the CPE-L lists, deletes relevant information of the CPE from the CPE-L-UC list, and then informs the CPE of the address of the SMM. Then, the SMM waits for a response message of the SMS, and the flow proceeds to Step 6.

5) Following Step 2, after receiving the device security service registration message, the SMS searches the NID-L.

5.1) If no designated NID exists in the NID-L, the SMS ignores it and does not make any response.

5.2) If a designated NID exists in the NID-L, the SMS searches the NTID-L according to the NTID and the NID.

5.2.1) If records fully matching the designated NTID and NID are found in the NTID-L, it indicates that the device has applied for or registered the security service, and the SMS responds with a registration successful message. If the registration message indicates that the CPE is a security device, the SMS attaches the password of the device in the NTID-L record to the response message. If the state identification in the record at this time is "1", the state is set to "2".

5.2.2) If the designated NTID record is found in the NTID-L but the NID in the record is different from the NID in the registration message, the SMS gives an alarm and responds to the SMM that the CPE has registered with other network.

5.2.3) If no designated NTID record exists in the NTID-L, it indicates that the user does not pre-apply for the security service for this device, and the SMS sends a message that should include the NTID to inquire whether the SMM performs the registration.

6) The SMM receives the response message of the SMS to the registration message.

6.1) The registration response message is "registration successful".

6.1.1) If the SMM is waiting for the user to confirm the CPE, if the CPE is a non-security device, the flow directly proceeds to 6.1.1.4; otherwise, the following steps are performed.

6.1.1.1) The SMM sends the password transmitted from the SMS to the CPE.

6.1.1.2) The CPE verifies the correctness of the password and returns a verification result (pass or fail) to the SMM.

6.1.1.3) The SMM receives the verification result of the CPE. If the verification is failed, the SMM returns error information to the SMS indicating that an error occurs when pre-applying for the security service, and meanwhile waits for the user's manual confirmation, i.e., the flow returns to Step 4.

6.1.1.4) The SMM adds the CPE to the CPE-L list, informs the CPE of the address of the SMM, and cancels waiting for the confirmation, i.e., deletes relevant information of this CPE from the CPE-L-UC.

6.1.2) If the user has performed the manual confirmation, at this time, the CPE has been deleted from the CPE-L-UC list and added to the CPE-L-UR list and the CPE-L list simultaneously, and the CPE has been informed of the address of the SMM, relevant information of the CPE is deleted from the CPE-L-UR, at which time the password sent from the SMS is ignored.

6.1.3) Or, the CPE has been registered before and already existed in the CPE-L list and also appears in the CPE-L-UR through Step 3.1, and the CPE has been informed of the address of the SMM, relevant information of the CPE is then deleted from the CPE-L-UR.

6.2) The registration response message is "the CPE has registered with other network". The SMM prompts the user that the device cannot be applied or gives no prompt, and deletes relevant information of the CPE from all the lists.

6.3) The registration response message is "inquire whether to perform the registration", which indicates that the CPE does not pre-apply for the security service to the SMS.

6.3.1) If the SMM is waiting for the user's confirmation, the SMM waits for the user to complete the confirmation (see Step 4), or the confirmation may have been completed.

6.3.2) After the manual confirmation is completed, the SMM sends a true registration message to the SMS and adds the CPE to the CPE-L list, but does not delete relevant information of the CPE from the CPE-L-UR list. If the CPE is a security device, the true registration message includes the password of the CPE.

7) After Step 6, the SMM may send a message indicating the registration is true or the password is wrong to the SMS or no message has been sent.

7.1) The SMS receives the message indicating that the CPE password is wrong, and the message includes the NID and the NTID of the CPE. The SMS gives a prompt to request for a manual intervention and correction of the information, and meanwhile changes the registration state to "1".

7.2) The SMS receives the "true registration" message including the NID, the NTID of the CPE, and the password (which is null for a non-security device). The SMS first searches the NID-L.

7.2.1) If no designated NID exists in the NID-L, the SMS ignores it and does not make any response.

7.2.2) If the designated NID exists in the NID-L, the SMS searches the NTID-L according to the NTID and the NID.

7.2.2.1) If records fully matching the designated NTID and NID are found in the NTID-L, the SMS responds with a registration successful message, records the password of the CPE (which is null for a non-security device) from the SMM to the NTID-L, and meanwhile sets the identification in the record to "2".

7.2.2.2) If the designated NTID record is found in the NTID-L but the recorded NID is different from the designated NID, the SMS gives an alarm and responds to the SMM that this CPE has registered with other network.

7.2.2.3) If no designated NTID record exists in the NTID-L, the SMS directly adds the record including the record password, and responds with the registration successful message.

8) For Steps 5 and 7 in which the SMM receives the "registration successful" message of the SMS, the method further includes the following steps.

8.1) For the "registration successful" message in Step 7.2.2.3, the SMM deletes relevant information of the CPE from the CPE-L-UR list.

8.2) The SMM may need to return a confirmation message to the SMS again and then end the session.

According to the foregoing description, various cases for the CPE to apply for the security service can be respectively described below through interactive diagrams.

Figure 5:
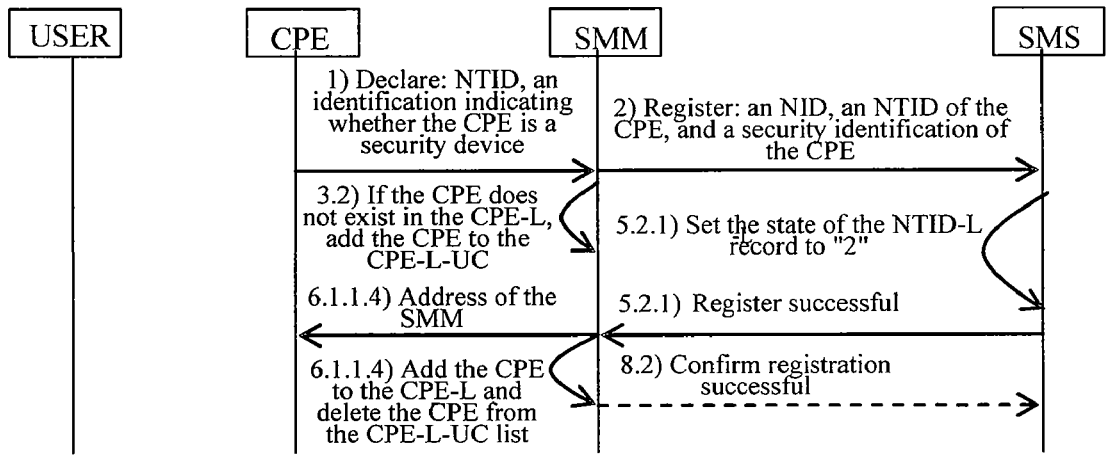
FIG. 5 is a flow chart illustrating processes for a non-security customer premises equipment (CPE) pre-applying for a security service to first register the security service in the method embodiment of the present invention.

If the user pre-applies for the security service to the SSP for a non-security device, the processes for the CPE to first register the security service with the SMS are shown in FIG. 5. The step number marked before every step in the figure corresponds to the step described in point II "Method of CPE security service registration", which is the same for FIGS. 6 to 15.

Figure 6:
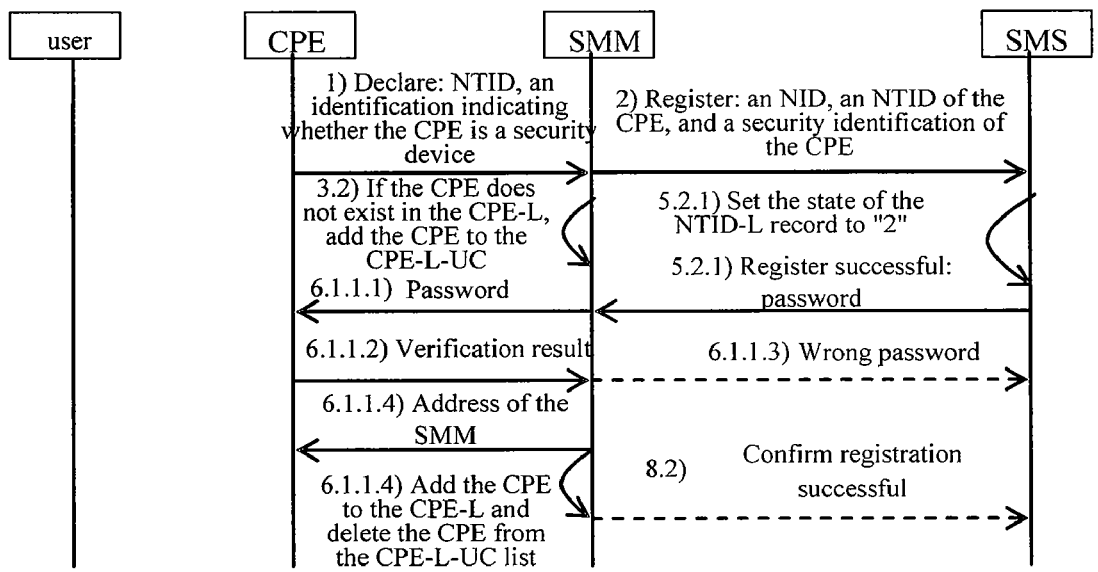
FIG. 6 is a flow chart illustrating processes for a security CPE pre-applying for a security service to first register the security service in the method embodiment of the present invention.

If the user pre-applies for the security service to the SSP for a security device, the processes for the CPE to first register the security service with the SMS are shown in FIG. 6.

Figure 7:
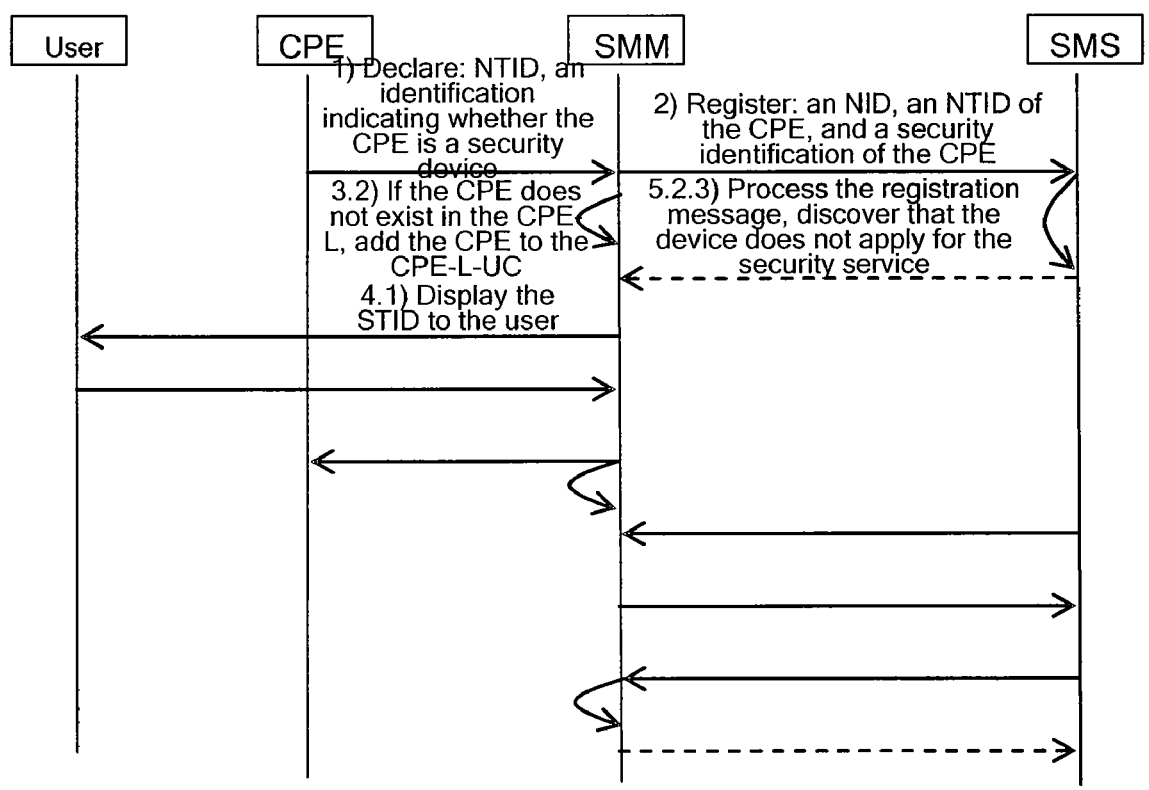
FIG. 7 is a flow chart illustrating processes for a non-security CPE without pre-applying for a security service to first register the security service in the method embodiment of the present invention.

If the non-security device does not pre-apply for the security service, the device can be simply confirmed after the access as long as the user has applied for the security service for his/her home network, as shown in FIG. 7.

Figure 8:
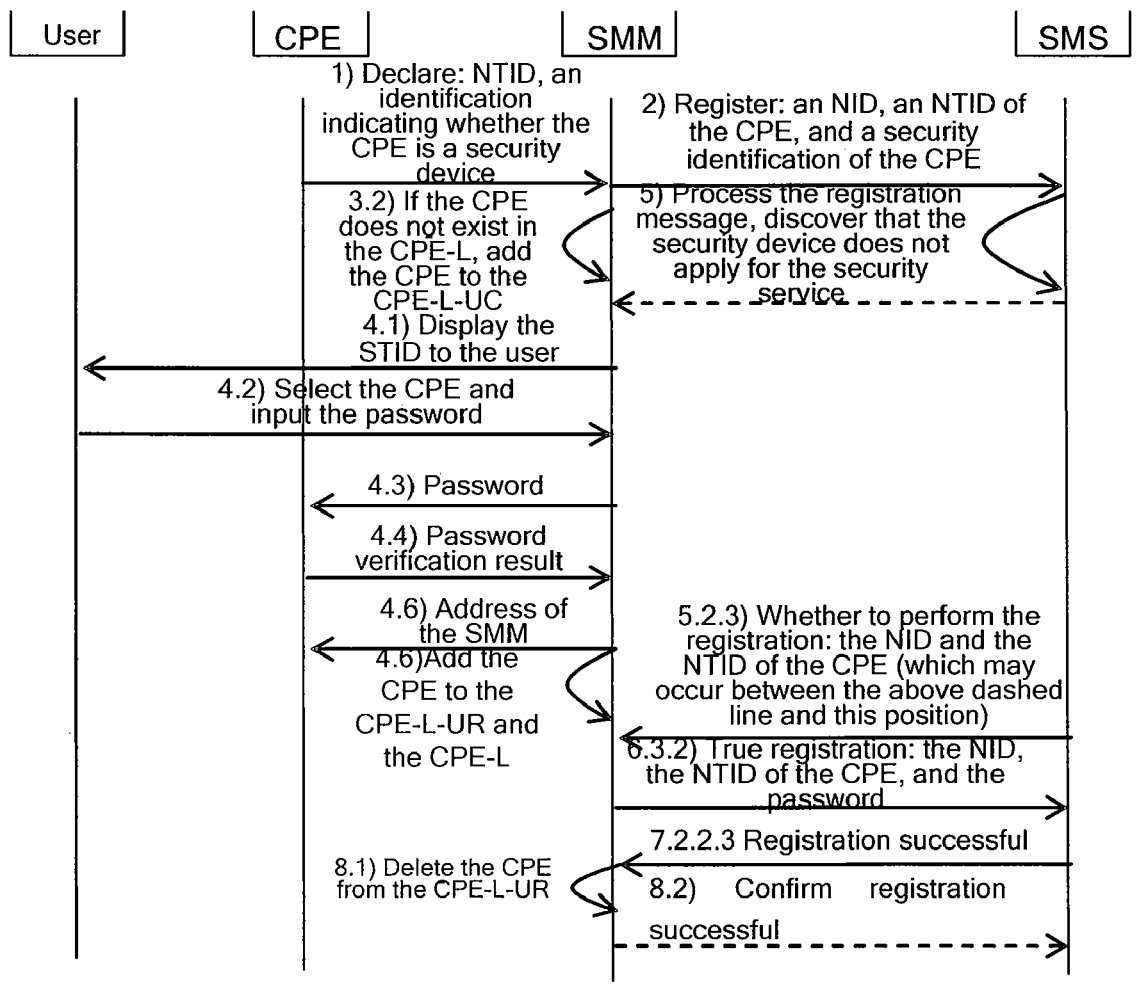
FIG. 8 is a flow chart illustrating processes for a security CPE without pre-applying for a security service to first register the security service in the method embodiment of the present invention.

If the security device does not pre-apply for the security service, the device can obtain the security service of the SMS through a manual confirmation after the access as long as the user has applied for the security service for his home network, as shown in FIG. 8.

Figure 9:
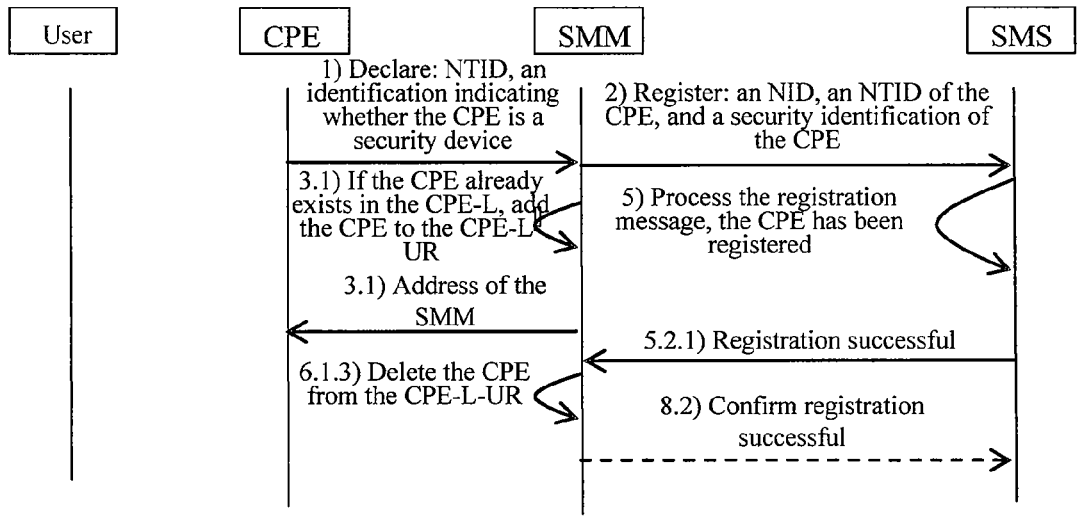
FIG. 9 is a flow chart illustrating processes for a legal device to re-register a security service in the method embodiment of the present invention.

A re-registration process for a CPE that has successfully registered the security service is shown in FIG. 9.

Figure 10:
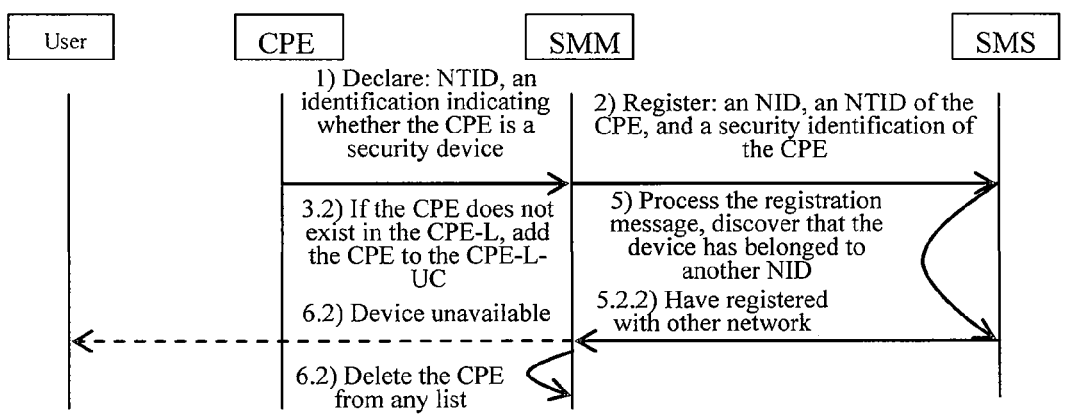
FIG. 10 is a flow chart illustrating a processing when the SMS discovers an illegal device in the method embodiment of the present invention.

If one CPE which has successfully registered a security service in other network or for which the security service is pre-applied is transferred to a network to which it does not belong for use, the SMS can discover the fact and give an alarm, as shown in FIG. 10.

III. Security Service without SMS

This mechanism ensures that the user's home network can still operate normally when the SMM cannot access the SMS. The mechanism is embodied in that, at the first registration of the device, it is not necessary to wait for a response of the SMS, and the CPE can obtain the security service of the SMM through the user's manual confirmation, as shown in the aforementioned Step 4 in point II.

In the aforementioned point II, if the SMM cannot access the SMS, the manual confirmation process can work. At this time, the SMM stores all relevant information of the CPE unregistered with the SMS which is stored in the CPE-L-UR.

When the SMM can access the SMS, the SMM sends information such as the NITD of the CPE in the CPE-L-UR to the SMS for a hysteretic registration. The method is the same as that in the aforementioned point II, but is hysteretic in time. The SMS can discover an illegal devices from such hysteretic security service registration behavior, which is the leading function of the SMS in such case. However, the user cannot modify the CPE-L-UR information in the SMM.

IV. Security Access Control Method

1. Access Between Devices within a Home Network

When a device accesses another device within the home network, the accessing device may first send an access request including its own NTID, or directly begin the process of establishing a connection as usual.

When receiving the request to establish the connection, the accessed device queries for the NTID of the accessing party from the accessing party if the NTID sent actively by the accessing party is not received before. When receiving such query, the accessing party must inform the accessed party of its own NTID.

The accessed party queries, from the SMM, whether the NTID of the accessing party is legal by the following method. The accessed device calls an interface of the SMM. The SMM checks the CPE-L. If the NTID of the accessing device is in the CPE-L, the device is considered legal; otherwise, the device is illegal.

Figure 11:
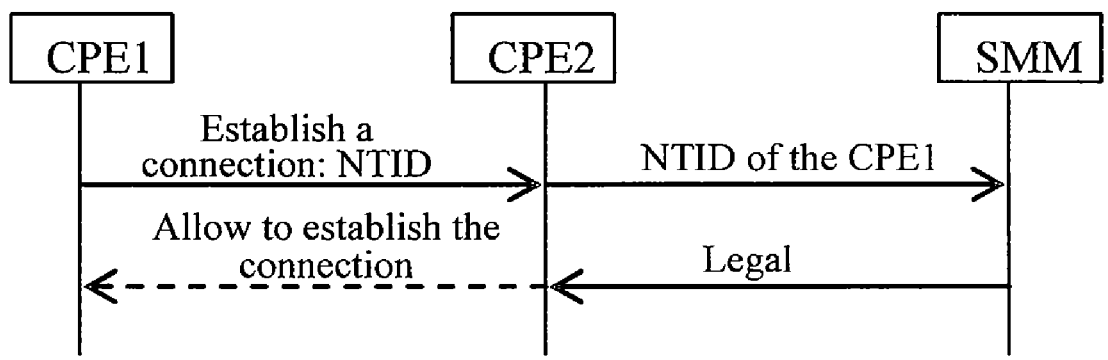
FIG. 11 is a diagram illustrating a first step for a CPE1 to access a CPE2: carrying a device identification (NTID) when establishing a connection in the method embodiment of the present invention.
Figure 12:
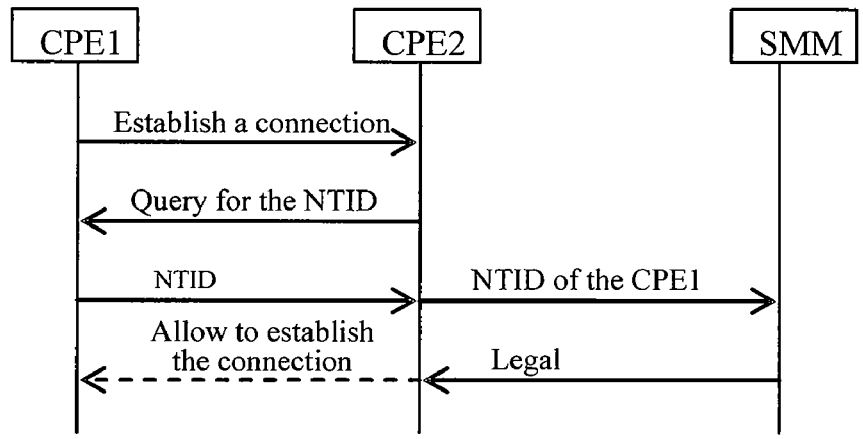
FIG. 12 is a diagram illustrating a first step for a CPE1 to access a CPE2: not carrying an NTID when establishing a connection in the method embodiment of the present invention.

The process of establishing the connection is shown in FIGS. 11 and 12. FIG. 11 shows a processing flow in which the NTID is carried when requesting to establish the connection. FIG. 12 shows a processing flow in which the NTID is not carried when requesting to establish the connection.

Figure 13:
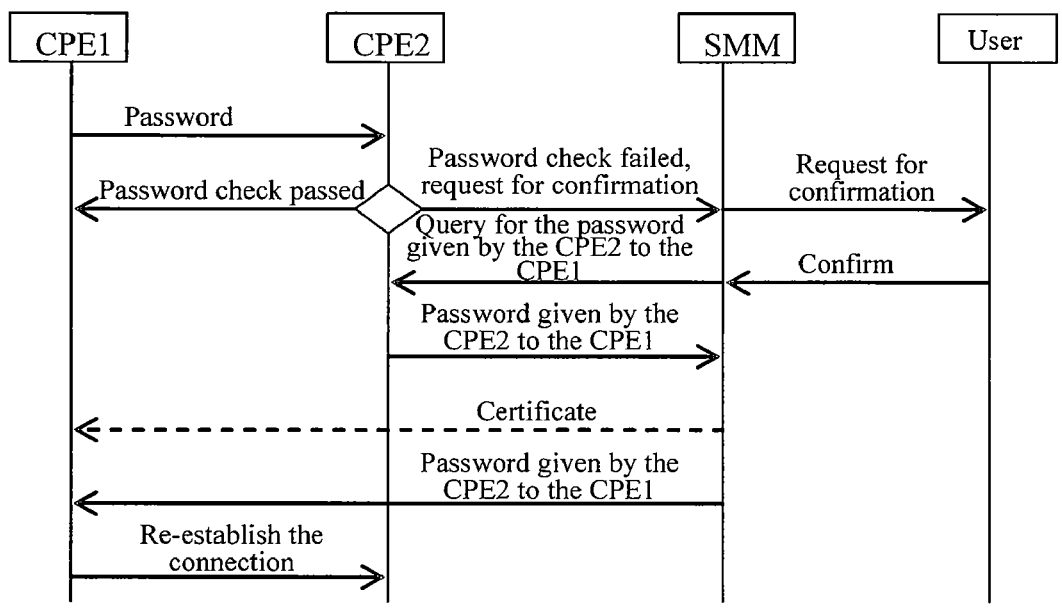
FIG. 13 is a flow chart illustrating processes for the CPE2 to authenticate the CPE1 in the method embodiment of the present invention.

As shown in FIG. 13, the accessed device can authenticate the accessing device. The device stores, on its own, an access authority list including NTIDs and certification keys of devices authorized to access the device. When the accessed device finds that the accessing party does not exist in the list or the authentication is failed (i.e., the password check in FIG. 13 is failed), the accessed device reports this event to the SMM. The user can manually determine by the SMM whether the accessing device is truly authorized to access the accessed device. If the SMM confirms that the accessing device is truly authorized to access the accessed device, the SMM reads a password from the accessed party and forwards the password to the accessing party. The communication between the SMM and the accessed party is transmitted secretly. The communication between the SMM and the accessing party is also transmitted secretly. If the accessing party has no certificate, the SMM issues one to it; otherwise, the original certificate is used.

The CPE can obtain a certificate from the SMM in the following process. The CPE randomly generates an equivalent key, encrypts the equivalent key with a public key of the SMM, and transmits the encrypted key to the SMM. The SMM uses the equivalent key of the CPE to encrypt a certificate and sends the certificate to the CPE.

The certificate sent to the CPE by the SMM may be generated by the SMM itself or obtained from the SMS. The SMS generates a certificate and sends it to the SMM at the SMM's request.

The process for a CPE to authenticate another CPE is shown in FIG. 13.

2. Access of Device within Home Network to the Outside

When intending to access the outside, a device within the home network must perform the access through an HGW. The HGW can verify the validity of the device by the same method as above and limit the authority of the device with the same access authority list, so that a confirmed legal device is allowed to pass through the gateway and an unconfirmed legal device cannot pass through it, which is equivalent to a filter list that is not pre-edited but established immediately when the device accesses the external network.

3. Access of External Device to Device within Home Network

The aforementioned access control mechanism for devices within the home network is equally applicable to the access of a device outside the network to a device within the home network.

The user's own nomadic device may pre-apply for a security service to the SMS or perform a manually confirmed security service registration within the home network and be truly registered with the SMS. When the nomadic device accesses the network from a public access point, a declaration message thereof does not work, because no SMM exists in the nomadic device's environment. However, this does not influence the nomadic device's access to the Internet, because the user device does not communicate with the SMM directly.

When the nomadic device accesses a certain CPE within the user's home network, the CPE inquires about the NTID of the nomadic device and then queries from the SMM. The subsequent process is the same as that of the access within the home network.

V. Device Deregistration

Figure 14:
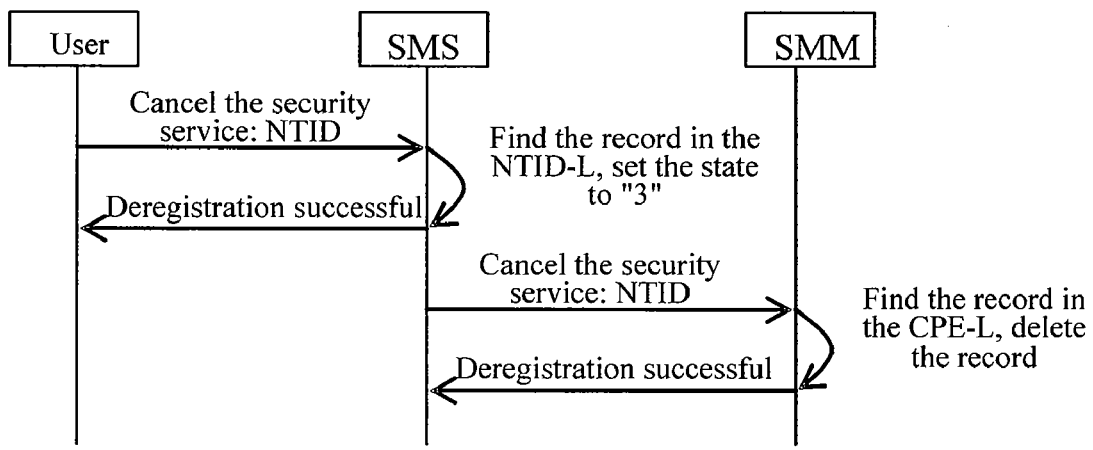
FIG. 14 is a flow chart illustrating processes for a user to cancel the CPE security service with the SMS in the method embodiment of the present invention.

When transferring his own device to other people, the user should deregister the security service of this device on the SMS, so that the transferee can apply for a security service for the device in order to avoid the alarm of the SMS when the device accesses another network. The deregistration process is shown in FIG. 14. The user sends to the SMS a request to cancel the security service with an NTID of a device to be deregistered. The SMS finds a corresponding record in an NTID-L and sets its state to "3", and then transmits a deregistration successful message back to the user. Meanwhile, the SMS sends to the SMM a message to deregister the security service with the NTID of the device to be deregistered. The SMM finds the corresponding record in a CPE-L and deletes it.

The user may also operate on the SMM within the home network to delete a device. Then, the SMM sends to the SMS a request to deregister the security service with the NTID of the device to be deregistered. The SMS finds the corresponding record in the NTID-L record list and sets its state to "3", and then transmits a deregistration successful message back to the user.

VI. Online Device Transfer

Figure 15:
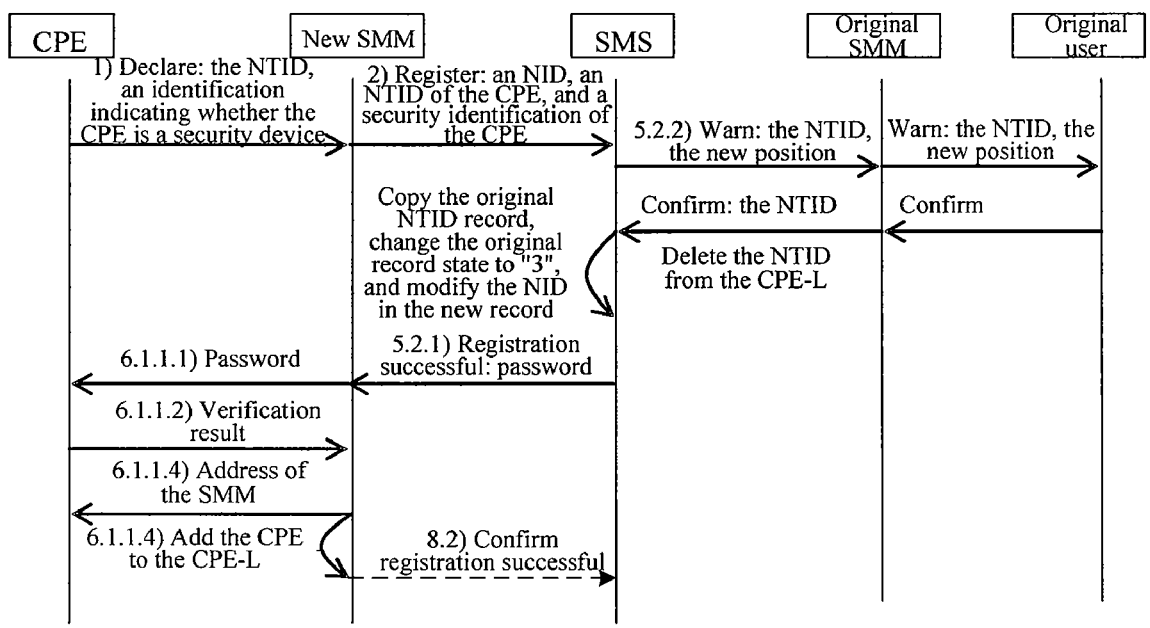
FIG. 15 is a flow chart illustrating an online confirmation for transferring a device in the method embodiment of the present invention.

As shown in FIG. 15, the user may not use the aforementioned deregistration method when transferring its device. After a user accepting the device makes the device access his/her network, the SMS may send a message including information about a user name and/or address, etc. of the new user and an NTID of the transferred device to the SMM in the home network of the original user of the device in the alarm step. The SMM of the original user of the device displays "Your device xxxx appears in xxx's home whose address is xxxxx, do you confirm it?" the original user only needs to select "Yes". After receiving the confirmation message of the original user, the SMS changes the state of the original record in the NTID-L list to "3" and automatically generates new records.

As can be seen from the aforementioned preferred embodiments, the embodiments of the present invention have the following beneficial effects.

(1) The pre-application process only requires the user to provide relevant information instead of understanding technical problems.

(2) The embodiments of the present invention are compatible with the UPnP or similar manual security confirmation mechanism. The user selects to use the pre-application or manual confirmation by himself/herself according to his/her own condition.

(3) The access security is stronger than that of the UPnP security mechanism. All accessed devices can verify the validity of accessing devices.

(4) Since the device is registered with the SMS, a device will be discovered by the SMS if it is illegally transferred to another network. As long as the access network provider forces the user's home network to have such an SMM that can be verified (for example, the SMM is a mandatory module of the HGW), the effect in this item can be achieved.

What is claimed is:

1. A security management system of a home network, wherein the home network comprises a home gateway (HGW) and one or more user devices capable of communicating with the HGW, comprising:
a security management server (SMS), configured to provide a security management service for the home network; and
a security management module (SMM), configured to provide a security service for the one or more user devices;
wherein the one or more user devices and a device having the SMM have unique network terminal identifications (NTIDs), including at least a home gateway ID and a user device ID, and the home network has a unique network identification (NID), which is assigned to the SMM and associated with the NTID of the device having the SMM at the SMS; the SMS communicates with the SMM by the HGW, the SMS and the SMM perform a security management for the home network through registering the home network and registering the user device by using of the NID and the NTIDs, where in the SMM in the home network can register the security management service with the SMS to obtain its own home network NID designated with a character string other than associated home network IP address.

2. The security management system of a home network according to claim 1, wherein the SMM is an independent physical device or a functional module of the HGW.

3. A security service registration method of a home network, comprising:
sending, by a security management module (SMM), a message of registration of the home network to a security management server (SMS); wherein, the message of registration of the home network at least comprise a network terminal identification (NTID), including at least a home gateway ID and a user device ID, of a device having the SMM, the NTID is capable of uniquely identifying a device, and the SMM is within the home network; and
sending, by the SMM, a message of registration of a user device within the home network to the SMS; wherein, the message of registration of the user device at least comprise the NTID of the user device and a network identification (NID) of the home network, and the NID is capable of uniquely identifying the home network and is assigned to the SMM and associated with the NTID of the device having the SMM at the SMS;
wherein the SMS is configured to determine whether to accept the registration of the SMM and the registration of the user device according to the NID of the home network, the NTID of the user device and the NTID of the SMM;
wherein the SMM in the home network can register to the SMS to obtain its own home network NID designated with a character string other than associated home network IP address.

4. The method according to claim 3, wherein the SMS is further configured to
accept the registration of the home network if the NTID of the SMM is recorded validly.

5. The method according to claim 3, wherein the NID is assigned automatically by the SMS, or designated by a user, or uses any of the information comprising an NTID of a device of the HGW or the device having the SMM, a wide area network (WAN) access account, an Internet domain name or a fixed IP address, and a home phone number of the user.

6. The method according to claim 3, wherein the SMS is further configured to
accept the registration of the user device and send a registration success message to the SMM if the NID of the home network and the NTID of the user device are recorded correspondingly in one record; and the method further comprises
adding the NTID of the user device to a record list of the SMM according to the registration success message.

7. The method according to claim 6, wherein the registration success message comprise a password of the user device if the user device is a security device; and the method further comprises:
sending, by the SMM, the password of the user device to the user device, wherein the user device is configured to verify a correctness of the password of the user device and send a verification result to the SMM;
wherein the adding the NTID of the user device to a record list of the SMM according to the registration success message is
adding the NTID of the user device to the record list of the SMM, and recording the password of the user device if the verification result is satisfied.

8. The method according to claim 3, wherein the SMS is further configured to send an inquiring message to the SMM if the NID of the home network is recorded and the NTID of the user device is not recorded correspondingly in the SMS, and the method further comprises
displaying, by the SMM, information of the NTID of the user device to a user according to the inquiring message;
receiving, by the SMM, a confirming message sent by the user according to the information of the NTID;
adding the NTID of the user device to a record list of the SMM according to the confirming message; and
sending, by the SMM, a true registration message to the SMS according to the confirming message;
wherein the SMS is further configured to record the NTID of the user device correspondingly with the NID of the home network, and respond with a registration successful message to the SMM in response to receiving the true registration message.

9. The method according to claim 3, wherein the SMS is further configured to send an inquiring message to the SMM if the NID of the home network is recorded and the NTID of the user device is not recorded correspondingly in the SMS, and the method further comprises
prompting, by the SMM, a user to confirm information of the NTID of the user device in response to receiving the inquiring message;
receiving, by the SMM, a confirming message comprising a password of the user device sent by the user according to the information of the NTID;
sending, by the SMM, the password to the user device to be verified;
receiving a verification result of the user device;
adding the NTID of the user device to a record list of the SMM if the verification result is satisfied; and
sending, by the SMM, a true registration message to the SMS according to the confirming message;
wherein the SMS is further configured to record the NTID of the user device correspondingly with the NID of the home network, and respond with a registration successful message to the SMM in response to receiving the true registration message.

10. The method according to claim 3, wherein when the SMM cannot access the SMS, after the SMM obtains the NTID of the user device, the method further comprises:

prompting, by the SMM, a user to input a password required by the user device to confirm information of the NTID of the user device;

receiving the password input by the user, and sending the password to the user device to be verified and receiving a verification result; and adding the NTID of the user device to a record list of the SMM if the verification result is satisfied.

11. The method according to claim 3, further comprising:

receiving, by an accessed device, an access request from a accessing device;

wherein, the accessed device is within the home network;

obtaining, by the accessed device, an NTID of the accessing device from the accessing device after receiving the access request;

sending, by the accessed device, the NTID of the accessing device to the SMM in the home network and requesting the SMM to verify whether the accessing device is valid; wherein, the SMM is configured to check whether the NTID of the accessing device exists in a record list of the SMM, and send a checking result to the accessed device; and allowing the accessing device to establish a connection with the accessed device if the checking message indicates that the NTID of the accessing device exists in the record list of the SMM.

12. The method according to claim 3, wherein when a user device within the home network accesses a device outside the home network, the method comprises:

sending, by the accessing device, an access message to the outside of the home network through a home gateway (HGW) of the home network; wherein, the HGW is configured to query for an NTID of the accessing device from the accessing device if the accessing device first sends the message to the outside of the home network; and sending, by the accessing device, the NTID of the accessing device to the HGW, wherein, the HGW is further configured to send the NTID of the accessing device to the SMM and request the SMM to verify whether the accessing device is valid; and the SMM is configured to check whether the NTID of the accessing device exists in a record list of the SMM, and send a corresponding response information to the HGW; and the HGW is further configured to send the access message to the outside of the home network if the corresponding response information indicates that the NTID of the accessing device exists in the record list of the SMM.

13. A security service registration method of a home network, comprising:

obtaining, by a security management server (SMS), a message of registration of the home network from a security management module (SMM); wherein, the message of registration of the home network at least comprise a network terminal identification (NTID), including at least a home gateway ID and a user device ID, of a device having the SMM, the NTID is capable of uniquely identifying a device, and the SMM is within the home network;

obtaining, by the SMS, a message of registration of a user device within the home network from the SMM; wherein, the message of registration of the user device at least comprise the NTID of the user device and a network identification (NID) of the home network, and the NID is capable of uniquely identifying the home network and is assigned to the SMM and associated with the NTID of the device having the SMM at the SMS, the SMM in the home network can register to the SMS to obtain its own home network NID designated with a character string other than associated home network IP address; and determining, by the SMS, whether to accept the registration of the SMM and the registration of the user device according to the NID of the home network, the NTID of the user device and the NTID of the SMM.

14. The method according to claim 13, wherein the determining, by the SMS, whether to accept the registration of the SMM and the registration of the user device according to the NID of the home network, the NTID of the user device and the NTID of the SMM comprises:

accepting the registration of the home network if the NTID of the SMM is recorded validly.

15. The method according to claim 13, wherein the determining, by the SMS, whether to accept the registration of the SMM and the registration of the user device according to the NID of the home network, the NTID of the user device and the NTID of the SMM comprises:

accepting, by the SMS, the registration of the user device and sending a registration success message to the SMM if the NID of the home network and the NTID of the user device are recorded correspondingly in one record; wherein the SMM is configured to add the NTID of the user device to a record list of the SMM according to the registration success message.

16. The method according to claim 15, wherein the registration success message comprise a password of the user device if the user device is a security device; and the SMM is further configured to send the password of the user device to the user device, wherein the user device is configured to verify a correctness of the password of the user device and send a verification result to the SMM; and add the NTID of the user device to the record list of the SMM, and record the password of the user device if the verification result is satisfied.

17. The method according to claim 13, wherein the determining, by the SMS, whether to accept the registration of the SMM and the registration of the user device according to the NID of the home network, the NTID of the user device and the NTID of the SMM comprises:

sending an inquiring message to the SMM if the NID of the home network is recorded and the NTID of the user device is not recorded correspondingly in the SMS, wherein the SMM is further configured to display information of the NTID of the user device to a user according to the inquiring message, receive a confirming message sent by the user according to the information of the NTID, and add the NTID of the user device to a record list of the SMM according to the confirming message;

receiving, by the SMS, a true registration message from the SMM according to the confirming message; and recording, by the SMS, the NTID of the user device correspondingly with the NID of the home network, and responding with a registration successful message to the SMM in response to receiving the true registration message.

18. The method according to claim 13, wherein the determining, by the SMS, whether to accept the registration of the SMM and the registration of the user device according to the NID of the home network, the NTID of the user device and the NTID of the SMM comprises:

sending an inquiring message to the SMM if the NID of the home network is recorded and the NTID of the user device is not recorded correspondingly in the SMS, wherein the SMM is configured to prompt a user to confirm information of the NTID of the user device in response to receiving the inquiring message, receive a confirming message comprising a password of the user device sent by the user according to the information of the NTID, send the password to the user device to be verified, receive a verification result of the user device, and add the NTID of the user device to a record list of the SMM if the verification result is satisfied;

receiving, by the SMS, a true registration message from the SMM according to the confirming message; and recording, by the SMS, the NTID of the user device correspondingly with the NID of the home network, and responding with a registration successful message to the SMM in response to receiving the true registration message.

19. A security management module (SMM), comprising one or more components for security service registration of a home network, wherein the one or more components are configured to:

send a message of registration of the home network to a security management server (SMS); wherein, the message of registration of the home network at least comprise a network terminal identification (NTID), including at least a home gateway ID and a user device ID, of a device having the SMM, the NTID is capable of uniquely identifying a device, and the SMM is within the home network; and send a message of registration of a user device within the home network to the SMS; wherein, the message of registration of the user device at least comprise the NTID of the user device and a network identification (NID) of the home network, and the NID is capable of uniquely identifying the home network and is assigned to the SMM and associated with the NTID of the device having the SMM at the SMS;

wherein the SMS is configured to determine whether to accept the registration of the SMM and the registration of the user device according to the NID of the home network, the NTID of the user device and the NTID of the SMM;

wherein the SMM in the home network can register to the SMS to obtain its own home network NID designated with a character string other than associated home network IP address.

20. A security management server (SMS), comprising one or more components for security service registration of a home network, wherein the one or more components are configured to:

obtain a message of registration of the home network from a security management module (SMM); wherein, the message of registration of the home network at least comprise a network terminal identification (NTID), including at least a home gateway ID and a user device ID, of a device having the SMM, the NTID is capable of uniquely identifying a device, and the SMM is within the home network;

obtain a message of registration of a user device within the home network from the SMM; wherein, the message of registration of the user device at least comprise the NTID of the user device and a network identification (NID) of the home network, and the NID is capable of uniquely identifying the home network and is assigned to the SMM and associated with the NTID of the device having the SMM at the SMS, the SMM in the home network can register to the SMS to obtain its own home network NID designated with a character string other than associated home network IP address; and determine whether to accept the registration of the SMM and the registration of the user device according to the NID of the home network, the NTID of the user device and the NTID of the SMM.

* * * * *